(12) United States Patent
Klein

(10) Patent No.: US 6,965,866 B2
(45) Date of Patent: Nov. 15, 2005

(54) PRODUCT WARRANTY REGISTRATION SYSTEM AND METHOD

(76) Inventor: Elliot Klein, 210 E. 15th St. Apartment 6K, New York, NY (US) 10003

(*) Notice: Subject to any disclaimer, the term of this patent is extended or adjusted under 35 U.S.C. 154(b) by 923 days.

(21) Appl. No.: 09/847,913

(22) Filed: May 2, 2001

(65) Prior Publication Data
US 2001/0027401 A1 Oct. 4, 2001

Related U.S. Application Data

(63) Continuation-in-part of application No. 09/562,973, filed on May 1, 2000, now Pat. No. 6,259,367.

(51) Int. Cl.$^7$ .............................................. G06F 17/60
(52) U.S. Cl. ............................... 705/1; 705/22; 705/28
(58) Field of Search .............................. 705/1, 14, 22, 705/28, 400

(56) References Cited

U.S. PATENT DOCUMENTS

| | | | |
|---|---|---|---|
| 4,786,907 A | 11/1988 | Koelle | |
| 4,818,998 A | * 4/1989 | Apsell et al. | 342/444 |
| 5,497,140 A | 3/1996 | Tuttle | |
| 5,521,815 A | * 5/1996 | Rose, Jr. | 705/28 |
| 5,841,116 A | 11/1998 | Lewis | |
| 5,936,527 A | 8/1999 | Isaacman | |
| 6,018,719 A | * 1/2000 | Rogers et al. | 705/24 |
| 6,081,827 A | 6/2000 | Reber | |
| 6,104,311 A | 8/2000 | Lastinger | |
| 6,107,920 A | 8/2000 | Eberhardt et al. | |
| 6,115,690 A | 9/2000 | Wong | |
| 6,121,880 A | 9/2000 | Scott | |
| 6,147,662 A | 11/2000 | Grabau et al. | |
| 6,154,137 A | 11/2000 | Goff et al. | |
| 6,163,693 A | 12/2000 | Rydbeck | |
| 6,167,378 A | 12/2000 | Webber, Jr. | |
| 6,170,748 B1 | 1/2001 | Hash et al. | |
| 6,177,860 B1 | 1/2001 | Cromer et al. | |
| 6,181,287 B1 | 1/2001 | Beigel | |
| 6,181,699 B1 | 1/2001 | Crinion et al. | |
| 6,182,053 B1 | 1/2001 | Rauber et al. | |
| 6,208,853 B1 | 3/2001 | LoVasco et al. | |
| 6,651,063 B1 | * 11/2003 | Vorobiev | 707/10 |
| 6,757,663 B1 | * 6/2004 | Rogers et al. | 705/24 |
| 6,792,465 B1 | * 9/2004 | Welsh | 709/229 |

FOREIGN PATENT DOCUMENTS

JP     2002342506 A  * 11/2002   .......... G06F/17/60

OTHER PUBLICATIONS

UPS internet web page (URL http://www.pressroom.ups.com/pressreleases/archives/archive/0,1363,3808,00.html), no date.*
DHL Internet web page (URL http://www.dhl-usa.com/Tech Tools/ReturnsHome.asp?nav=TechnologyTools/Returns), no date.*
Motorola, Inc. "BiStatix TM Technology—A White Paper, Vers. on 4.1, www.motorola.com/smartcard/4_6_whitepaper.htm".

* cited by examiner

Primary Examiner—John G. Weiss
Assistant Examiner—Michael J Fisher
(74) Attorney, Agent, or Firm—Michael B. Fein; Cozen O'Connor

(57) ABSTRACT

A method for obtaining warranty registration of products, facilitating return of lost products, and expediting warranty service on defective products comprising providing a unique identifier on or within each product; providing a lost and found system comprising the steps of marking each product with return instructions and a reward offer to any person who finds said product after it has been lost; and offering to return each product to a registered owner in the event said product is lost and returned by said person who finds it if said owner provides data comprising owner identification and date said product was purchased at retail; providing said data to a manufacturer or other warrantor in order to register said warranty.

16 Claims, 1 Drawing Sheet

PRODUCT WARRANTY REGISTRATION SYSTEM AND METHOD

CROSS-REFERENCE TO RELATED APPLICATIONS

This is a continuation-in-part of application Ser. No. 09/562,973, filed May 1, 2000, now issued as U.S. Pat. No. 6,259,367 which is hereby incorporated by reference.

BACKGROUND OF THE INVENTION

1. Field of Invention

The present invention relates to methods of registering and managing warranty information for consumer products, and for providing warranty service to consumers.

2. Description of Prior Art

It is common for an identification card or reply post card to be included in products to request data to help register and link the product's serial number with warranty and ownership data. Such ownership data includes the owners name, address, date of purchase or installation of the product, name of dealer or store, and may also include installer's name, age, income range, reason for purchase, and other demographic information. The data is usually supplied on a postcard ("warranty card") or at a warranty registration web site. Most purchasers of such products do not complete and mail in these warranty cards or go online to bother to register the warranty, which is very undesirable for the manufacturers for a number of reasons. The manufacturer desires to know the date the product went into service so as to be able to calculate the expiration date of the warranty and avoid disputes about warranty claims on expired warranties.

Manufacturers of consumer products have attempted to improve the rate at which consumers register the warranties on products for several reasons. These reasons include the desire to track the demographics of the purchasers, to be able to notify consumers of improvements or recalls, and to track the date the product was put in service or purchased in order to determine when the warranty has expired and to avoid having to provide warranty service after the termination of the warranty. For example, see LoVasco, et al., U.S. Pat. No. 6,208,853, of Mar. 27, 2001 which relates to an automated cell phone product warranty registration system.

Among the methods which manufacturers have tried are contests which a consumer can enter by returning the warranty form and thereby possibly winning a prize. Another method has been to set up online registration web pages which is more convenient for some purchasers than returning a warranty card. However, in spite of expensive campaigns and other efforts of manufacturers of consumer products, it is well known that less than 10% of product warranty cards are returned to the manufacturers and only a small percentage of purchasers bother to go online to register their warranties. A solution to this problem has been long sought.

When a product which is under warranty has a defect or problem which requires returning it to a service location for repair, an owner must first verify with the manufacturer that the product is still under warranty, then the owner must determine the service location, and then the owner must package the product and send it to the service location. These steps are time consuming and for some owners, very difficult to accomplish. This process is also a burden on the manufacturer because the consumer will typically have to call a toll-free manufacturer number to find out the service location and whether the warranty is still in force, as well as details as to how to return the defective product for service.

In the aforementioned Ser. No. 09/562,673, I disclosed a return system and method which employs RFID transponders which are affixed to articles and are used to identify the articles for efficient identification of the owner in the event that a lost article is found. My return system links owner information to a database which can be accessed by a courier service such as Federal Express, UPS, U.S. Postal Service, and the like which has an RFID reader connected to the a client-server computer system such as the Internet.

SUMMARY OF THE INVENTION

It is an object of the present invention to provide an improved method of registering and managing warranty information for consumer products, and for providing warranty service to consumers.

Another object is to provide an improved system for registering product owner data and facilitating return of lost products to the owner when found.

A further object is to provide an improved method for determining whether a warranty is in force and servicing a defective product under an in force warranty.

These objects, and others which will become apparent from the following disclosure, are achieved by the present invention which comprises in one aspect a method for obtaining warranty registration of products, facilitating return of lost products, and expediting warranty service on defective products comprising providing a unique identifier on or within each product; providing a lost and found system comprising the steps of marking each product with return instructions and a reward offer to any person who finds said product after it has been lost; and offering to return each product to a registered owner in the event said product is lost and returned by said person who finds it if said owner provides data comprising owner identification and date said product was purchased at retail; providing said data to a manufacturer or other warrantor in order to register said warranty.

My present invention preferably utilizes the computer system disclosed in my previously cross-referenced prior patent, including the RFID tag contained in the return label described in said prior patent and the client-server computer system with centralized storage of ownership information cross-referenced to RFID tag identity, but the present invention is not limited to the use of RFID tags to provide the unique identifier. Bar coded unique identifiers (excluding the encoded 2D PDF47 barcode specification developed by Symbol Technologies, Inc.) or other emerging RFID technologies such as (i.e., "Bluetooth" specification) can be used on the return instruction tag, for example.

According to the preferred method, a person who finds a lost article which is registered under this system will see the return instructions and reward offer and will deliver the product to a return location where a return agent can automatically access the unique identifier, preferably by use of an RFID reader apparatus and accessing an online database, thereby facilitating identification of the owner and owner address whereupon the lost product can be returned by the return agent. The return agent is preferably a courier service, which ordinarily makes deliveries of packages and overnight letters, and is already equipped to pack and deliver packages to many locations.

The unique identifier is preferably supplied in an RFID, which is embedded in the label which describes the reward and provides the return instructions. For example, the label containing the RFID may say a reward of $10 will be provided, and that the product should be returned to any Federal Express location where it will be packed and shipped to the owner. One method is to automatically charge the owner for the reward and the return delivery charges by using the owner's previously supplied credit card or other billing information. The product can be an electronic product such as a cell phone, lap top computer, hand held game computer or personal digital assistant such as sold under the Palm or Blueberry brands, which has an electronic display screen. The return instructions and a reward offer can be automatically displayed on the screen when such electronic product is powered on.

The consumer purchaser or owner identification information and date and place the product was purchased can be provided at the point of purchase at retail, and that point of purchase can automatically provide such information online to a database, where it is accessible by the manufacturer for warranty purposes, and by the courier service for return purposes. In other words, in one step the warranty can be registered automatically, without any effort by the purchaser, and the purchaser can elect to provide return insurance by allowing the seller to apply the label containing the return instructions and the RFID, in a preferred embodiment. The label can be provided at no cost, with a disclosure that only in the event that the product is lost and then found will there be any cost to the purchaser. At the time the product is found and returned to a return location, the purchaser enrolls in the return-when-lost service by agreeing, in such preferred embodiment, to allow the reward and return courier charges to be charged to the purchaser's account such as a credit card or other prepaid shipping account number. The enrollment may be free, and the only charges would be if and when the product is lost and then found, and when the product has a defect and must be returned to a service location. In the latter case, the owner preferably is instructed to merely bring the article to any courier service, i.e., Federal Express in this example, at which time the courier service will assist with pack, ship, and reaffirm that the warranty is in force and the location where the manufacturer wants the product to be delivered for service. When service is complete at the service location, the courier service is notified to pick up the article for return to the owner. The cost of the courier service can be on the manufacturer or the owner.

Preferably, owner information and related warranty coverage is maintained by an operator of the return service in a computer server which is accessible from client computers over the Internet, and when an product is returned, the product is identified by the unique identifier on or within the product, the server is queried with the identifier, and arrangements are made for return of the product to the owner and payment of a reward to the finder. The owner information preferably comprises the owner name, home address or travel itinerary, and billing authorization, which is maintained by an operator of the return service in a computer server which is accessible from client computers over the Internet, and when an product is returned, it is identified by the unique identifier on or within the product, the server is queried with the identifier, and arrangements are made for return of the product to the owner, payment of a reward to the finder, and charging the amount of the reward plus a service fee to the owner, using the billing authorization.

DETAILED DESCRIPTION OF THE INVENTION AND PREFERRED EMBODIMENTS

The present invention provides an improved method of inducing purchasers of products to register the warranty with the manufacturer (by "manufacturer," I mean any warrantor, whether it is the manufacturer, importer, distributor, or any party to whom traditional warranty registration cards are normally returned). At the same time, the purchaser who provides warranty registration data (usually the purchaser's name, physical mailing and/or electronic contact addresses, date of purchase, and place of purchase) receives a bonus in the form of registration under a lost product return service wherein instructions on the product (usually in a label) offer a reward to any person who finds the product if it becomes lost and returns it to a designated return location. The return location is preferably a courier, package delivery service or retail store location. A preferred service can be identified, e.g., Federal Express, U.S. Postal Service, UPS, commercial airline or a competitive service. The service preferably has contracted with the return service to return products to the owner. The owner is identified by the service by communicating the unique product identification information, preferably automatically by reading embedded RFID information or a bar code in or on the label itself, and communicating it to a central location such as by computer assisted communication to a central computer server. After the owner is identified, the owner is automatically notified and the service returns the object to the owner. Preferably the owner has previously provided charge information such as a credit card, and the card is charged a service charge for returning the object as well as a reward to the finder.

The invention also uses the unique product identification, which is preferably embedded in the RFID device in the label to facilitate warranty service. The label preferably contains instructions to the consumer, i.e., owner of the product, to return the product to any location of the service, or for an additional charge the service will pick up the product from the owner in the same manner as it usually picks up packages, and will read the product identification information, e.g., using an RFID reader, and will communicate that information to a remote computer, which will respond with confirmation that the warranty is in force, an authorized location where the defective product should be delivered for service, and at the same time the computer system will notify the manufacturer to expect delivery of the defective product. In that way the manufacturer can more efficiently plan for the receipt of defective products and specified repair locations.

For manufacturers, the invention offers a new way to gather product ownership and warranty data and provide a cost efficient and timesaving solution for warranty repair and return using the resources of package delivery and drop-off services such as those offered by FedEx. Customers may soon no longer need to wait for special boxes to wrap their products or even wait in line at the post office to complete warranty service repairs. The invention offers a new range of drop-off or pick-up convenience solutions to save time and money for both end customers and manufacturers of devices protected by warranty programs. Such programs are especially beneficial to speed repair and customer service time and cost for critical business computing or portable industrial devices such as notebook PCs, Palm devices, tablet computers medical devices, and field computing or communication devices.

The invention network works with a self-adhesive ID label that integrates a flat RFID chip and antenna into the label itself. The digital ID inside each RFID chip determines who the item's owner is and instructions for warranty and/or other returns processing, according to rules set by the item's owner or manufacturer, as it is sent on its way to a database, which routes it. Those rules can be used to set priorities for certain kinds of data or individual customers with a database lookup.

The ID number and return instructions are also visibly pre-printed on the labels so the system can work without a wireless RFID network just by using a toll free hotline number and/or e-mail or other web address information printed on the labels. It is also possible to print a simple and personalized bar code on the labels themselves, should a RFID reader not yet be installed at a specific delivery location.

A typical RFID label carries a unique customer ID number embedded in a computer chip. It's scanned by a reader, which is linked to a customer's database information and a credit or debit account.

The unique design allows RFID labels (e.g., Motorola BiStatix chips) to be affixed to virtually any non-conductive paper or plastic-based carrier. The invention uses these attributes to manufacture self-adhesive labels to conform to the shape of virtually any product, such as a cell phone, laptop PC, PDA or key ring, or even the product itself.

BiStatix technology combined with the proposed system enables a true 'lost & found' and warranty returns system and method—incorporating reliable identification and return receipt coordinated by a delivery service with integrated communication, labeling, billing, tracking and shipment combined with the Internet—all triggered and communicated via a smart label. The system creates a method to remotely interrogate smart materials embedded in objects to determine their identity and facilitate their return through a tracking and delivery network, utilizing wireless and Internet communications.

Alternatively, the RFID tag or label could be hidden inside the product or inside the tag or label (i.e., placed within the battery compartment of a cell phone). The instructions printed on the tag might be as simple as printing an indicia to "bring this item to XYZ Package Place for immediate return/reward, etc."

The parcel organization(s) reads the information on the intelligent RFID tag or label that can be linked to a database complete with web site URL, owner ID number, product serial number or other instructional data from the label's ID code. This information is then integrated into the parcel services systems and network(s) that are connected to e-mail notification, online tracking, and other processing and return processing capabilities through the Internet.

The invention uses both wireless and Internet technologies to make it easier to handle returns integration.

One aspect of the invention is a computer-assisted method for manipulating warranty registration information. The method includes the steps of acquiring product registration information from one or more database sources, identifying one or more portions of the acquired warranty or product ownership information as relating to a particular product, and creating a computer-readable file having the identified portions.

In one embodiment, access is provided to the computer-readable file over a computer communications link. In another embodiment, the acquiring step comprises acquiring the warranty information a wireless link using RFID technologies. In another embodiment, a file is created that contains a warranty record of the particular product. In another embodiment, the identifying step includes identifying the effective date of the compliance information, identifying an amended compliance information item that the warranty information is amending and determining an effective date of the warranty coverage information from the effective date of the amended compliance information item.

The system for providing product registration and access to product warranty registration information includes a subsystem for acquiring warranty registration information from one or more database sources. The system extracts owner information and coverage dates from the acquired warranty information that is related to a particular product. The system also includes a subsystem for providing access to the computer-readable compliance information files over a computer communications link that uses the Internet to help update or append the database with new information, such as travel destination contact addresses (i.e., from flight or travel booking itinerary), or purchase of an extended warranty coverage protection.

The approach automates to the greatest degree possible, in a unified and synergistic fashion and using best proven business practices, the various aspects of managing a successful and simplified warranty registration and related product warranty return shipment system and method. The effect of such integration on the warranty returns process is profound, allowing the return of virtually anything with an RFID label to be drastically streamlined.

In accordance with the teachings of the present invention, a sticker transponder adapted to be affixed to a product surface, such the back of a notebook PC, Palm Pilot or cell phone, includes an RFID transponder enabling the storage and retrieval of product related data.

More particularly, the sticker transponder comprises a flexible circuit substrate having an antenna formed thereon and a transponder circuit disposed on the substrate and coupled to the antenna. An adhesive layer is coupled to a first surface of the flexible circuit substrate. An indicia layer is coupled to a second surface of the flexible circuit opposite from the first surface. The indicia layer comprises a space permitting indicia to be printed thereon. The transponder circuit further includes a memory having a read-only portion and a re-writable portion.

The sticker transponder may be used to store various types of data, such as data pertaining to a product (e.g., product brand/model and unique serial number) or product's owner. For example, the read-only portion of the memory may be preprogrammed with data that cannot be altered, such as a product identification number. Other types of data, such as product registration data, may be stored in the re-writable portion of the memory or linked by online database and periodically updated.

A more complete understanding of the sticker transponder will be afforded to those skilled in the art, as well as a realization of additional advantages and objects thereof, by a consideration of the following detailed description of the preferred embodiment. Reference will be made to the appended sheet of drawings that will first be described briefly.

DETAILED DESCRIPTION OF THE PREFERRED EMBODIMENT

Figure 1:
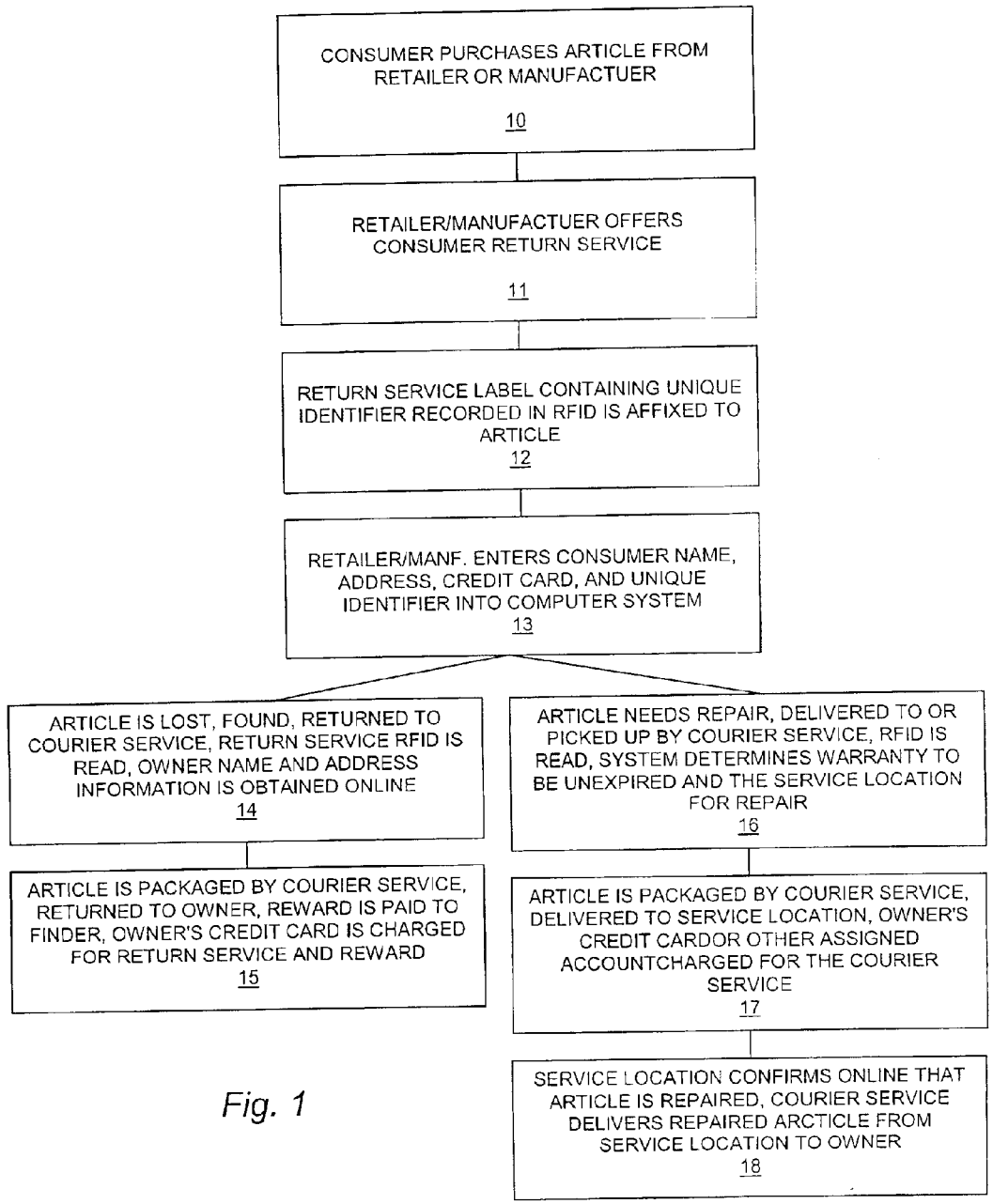
FIG. 1 is a flowchart of the method of the present invention.

Referring to FIG. 1, a preferred method of the invention may be initiated when a consumer purchases 10 an article from a retailer which offers the consumer return service. The retailer offers 11 the purchaser the consumer return service. The retailer may explain the return service at that time. If the consumer accepts the return service, the retailer can affix 12 a return service label to, on, or in the article. The label contains an RFID device with a unique identifier. The retailer then may scan the label to read the unique identifier, and may automatically enter 13 the identifier along with the purchaser's name and address into an online computer system. Assuming the consumer charges the article to a credit card, the same credit card information may be automatically transmitted to the return service computer system. In some embodiments, the credit card company may provide the return service, in which case the credit card owner information is already stored in the credit card company's computer system.

If the article is lost by the owner/purchaser, and then found by someone who reads the label and follows the instructions for obtaining a reward, the article is returned to a courier service, e.g., Federal Express, which has RFID readers at each location. The Federal Express location then reads the RFID and obtains 14 the owner's name and address online, and determines owner's credit card validity, and then follows a return procedure 15 which includes first charging the owner's credit card for a reward and for packaging and returning the article to the owner, and then the courier service pays the reward to the finder, e.g., $10 as indicated on the return label, packages the article, and returns the article to the owner.

If the article needs repair, the owner may request that Federal Express pick up the article or may bring the article to any Federal Express authorized drop off location, at which point the RFID is read 16 and the unique identifier is automatically sent online to determine whether the warranty is in force and the service location where the manufacturer has designated for repair. The courier service then charges 17 the credit card for packaging and delivering to the service location. In some embodiments the manufacturer or the credit card company, or an insurer, are charged for the packaging and delivery service to the service location. When the article is repaired, the service location confirms 18 that fact online and the courier service is notified to pick up the article from the service location to the owner location.

Although the invention has been described in conjunction with specific embodiments, other alternatives, modifications, variations and improvements should become readily apparent to those skilled in the art without departing from the spirit and scope of the invention.

What is claimed is:

1. A method for expediting warranty service on defective products comprising: providing a unique identifier on or within each product, the unique identifier electronically recorded in a Radio Frequency Identification Device (RFID) transponder; providing consumer purchaser or owner identification and retail purchase date data to a manufacturer or other warrantor; wherein the manufacturer or other warrantor registers a warranty with respect to the product upon receiving the data; providing means to read the unique identifier at courier service locations; and providing a web server computer system which, upon reading a unique identifier on a defective product which is picked up by the courier service or brought to a courier service location, authorizes the courier service to deliver the defective product to a warranty return location or indicates that the warranty is not in force.

2. Method of claim 1 wherein upon said product being returned to a return location, said data is accessible at said return location or by a return agent, thereby facilitating identification of said owner and owner address, whereupon said product can be returned by said return agent.

3. Method of claim 1 wherein said consumer purchaser or owner identification information and date said product was purchased at retail are provided at said point of purchase at retail by automatically accessing customer identification information provided to said retail seller in connection with said purchase and said date of purchase.

4. Method of claim 1 wherein said product retail purchase date and consumer or owner identification are automatically provided to said manufacturer or distributor when said information is received from said consumer purchaser or owner, and said manufacturer is automatically charged for delivery of said purchase date and consumer or owner information.

5. Method of claim 1 wherein said owner information is maintained in a web computer server which is accessible from client computers over the Internet, and when a product is returned, said product is identified by said unique identifier on or within said product, said server is queried with said identifier, and arrangements are made for return of said product.

6. Method of claim 1 wherein said courier service is an overnight courier or parcel service which has equipment to automatically read said unique identifier on or within said product and to automatically query a remote return service computer server which, in turn, automatically provides corresponding owner contact notification and/or return shipping information.

7. Method of claim 1 wherein said courier service can automatically query said manufacturer over the Internet to determine whether a product is within warranty return privileges and to receive authorization to accept return of said product from said owner and ship said product to an authorized service location.

8. Method of claim 1 wherein said return instructions are contained in a label which includes an RFID sticker transponder adapted to be affixed to a product surface, comprising a flexible circuit substrate having an antenna formed thereon and a transponder circuit disposed on said substrate and coupled to said antenna.

9. Method of claim 8 wherein said sticker transponder comprises an adhesive layer coupled to a first surface of said flexible circuit substrate.

10. Method of claim 9 wherein said sticker transponder comprises a release liner affixed to said adhesive layer, said release liner being selectively removable to permit said sticker to be affixed to said product.

11. Method of claim 10 wherein said sticker transponder comprises an indicia layer coupled to a second surface of said flexible circuit substrate opposite from said first surface, said indicia layer comprising a space permitting indicia to be printed thereon.

12. Method of claim 11 wherein said transponder circuit further includes a memory.

13. Method of claim 1 wherein a product is delivered for repair to a courier service which has means to access to said warranty registration data which is stored on a remote computer storage medium by reading said unique identifier on or within said product, and wherein said service thereby determines whether said warranty is in force and a warranty service location to which to deliver said defective product.

14. Method of claim 1 wherein said unique identifier on or within each product sold by said manufacturer is electronically recorded in an RFID device embedded within a label on which are printed return instructions which identify a courier service which is equipped to read said RFID device, wherein said courier service has means to access owner identification, owner address, and warranty information corresponding to said unique identifier, and wherein said service thereby delivers defective products to an authorized warranty service location.

15. Method of claim 1 further comprising the steps of marking each product with return instructions and a reward offer to any person who finds said product after it has been lost; and offering to return each product to a registered owner in the event said product is lost and returned by said person who finds it if said owner provides data comprising owner identification and/or date said product was purchased at retail.

16. Method of claim 15 wherein the return instructions comprise a reward offer to any person who finds the product after it has been lost.

* * * * *